Jan. 26, 1932.  N. H. HIATT  1,842,608
FLUID BRAKE
Filed Aug. 21, 1930   3 Sheets-Sheet 2
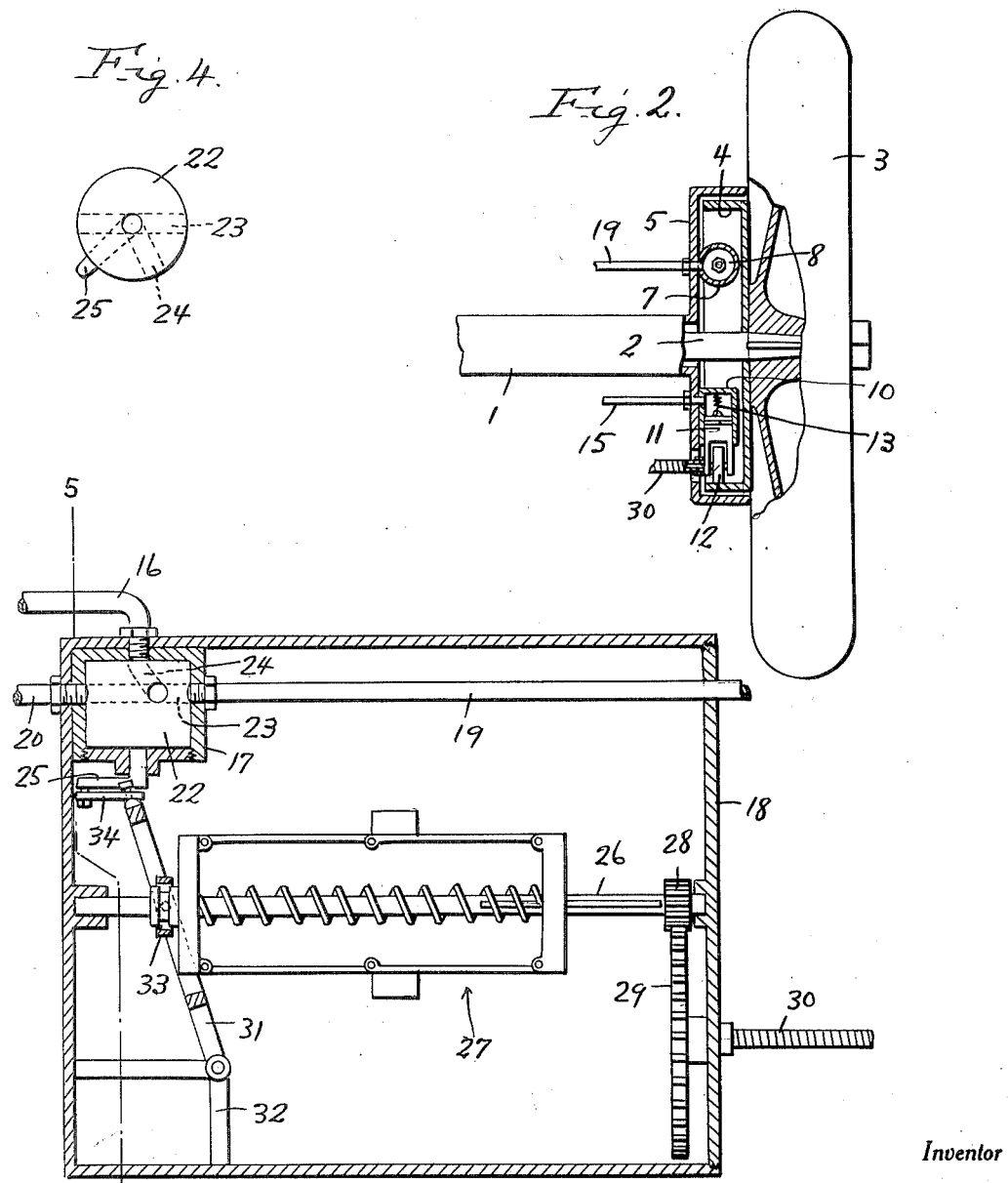

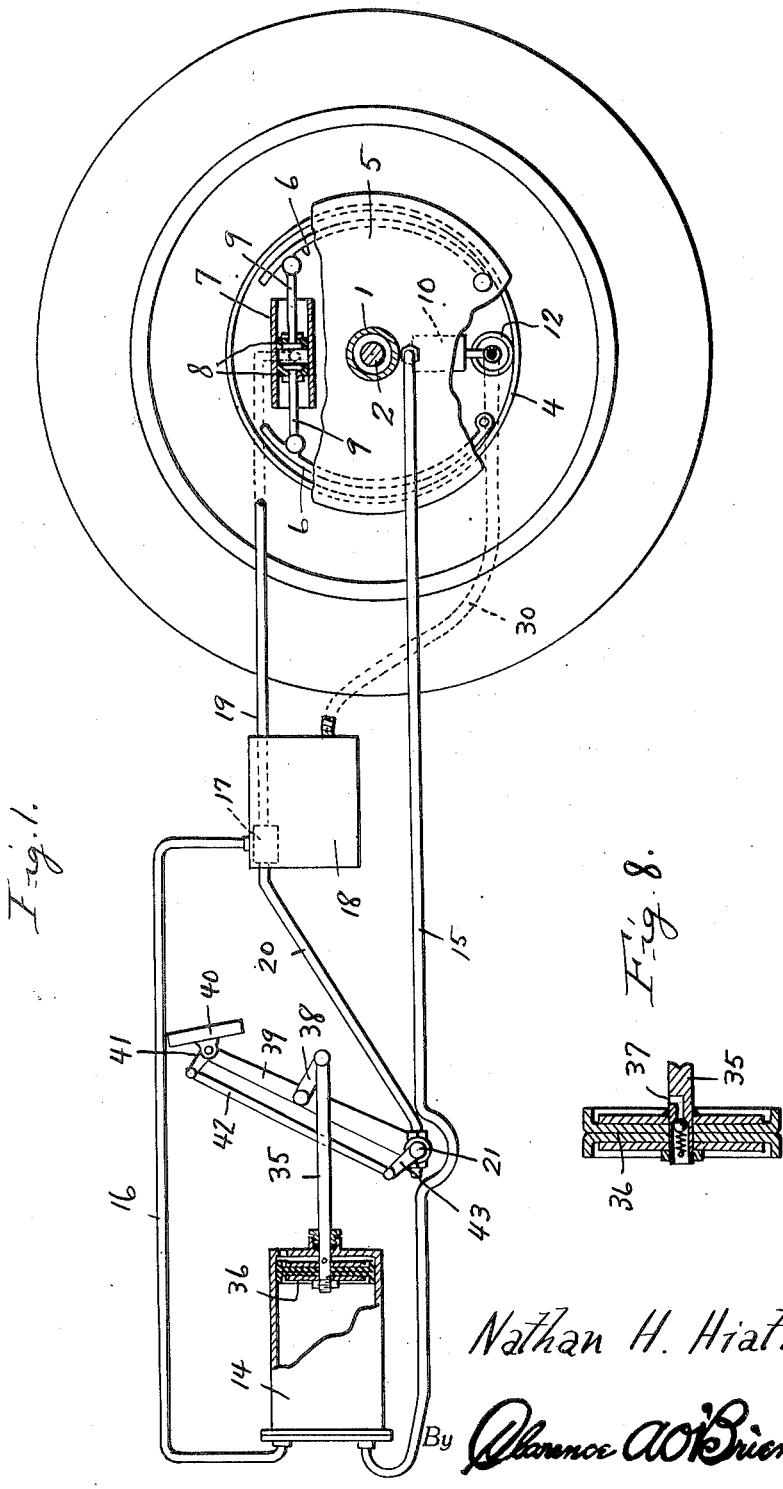

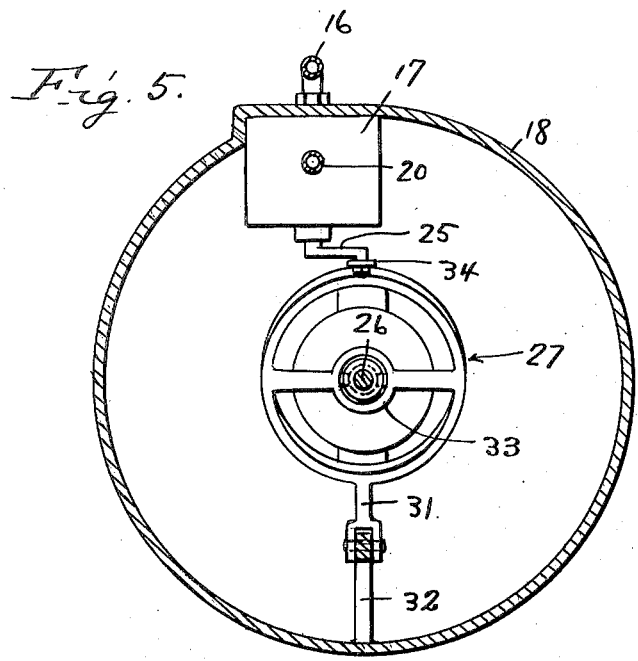
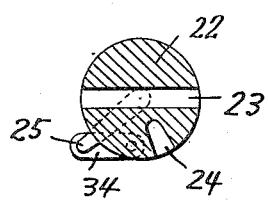
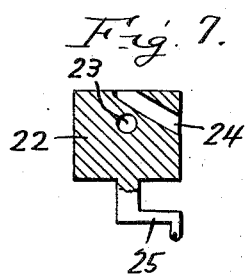

Patented Jan. 26, 1932

1,842,608

UNITED STATES PATENT OFFICE

NATHAN H. HIATT, OF PORTLAND, OREGON

FLUID BRAKE

Application filed August 21, 1930. Serial No. 476,843.

This invention relates to new and useful improvements in fluid brakes particularly adapted for use on automotive vehicles, and has, for its primary object to provide, in a manner as hereinafter set forth, a fluid brake embodying means whereby said brake will automatically release the wheel as soon as said wheel is locked and ceases to rotate, thus eliminating or reducing skidding to a minimum, and also reducing wear on the tires of the vehicle.

Other objects of the invention are to provide a fluid brake of the character described, which will be simple in construction, strong, durable, efficient in its use, and which may be manufactured at low cost.

All of the foregoing and still further objects and advantages of the invention, may be apparent from a study of the following specification, taken in connection with the accompanying drawings, wherein like characters of reference designate corresponding parts throughout the several views, and wherein:

Figure 1 is a view partly in side elevation and partly broken away in section, showing a fluid brake constructed in accordance with this invention.

Figure 2 is a view in vertical cross section through the portion of the brake mechanism which is mounted or associated with the wheel.

Figure 3 is a vertical longitudinal sectional view through the three-way valve and the actuating governor therefor.

Figure 4 is a detail view in top plan of the three-way valve core.

Figure 5 is a vertical cross sectional view, taken substantially on the line 5—5 of Figure 3.

Figure 6 is a horizontal sectional view, through the valve core.

Figure 7 is a vertical cross sectional view through the valve core.

Figure 8 is a sectional view showing the valved end portion of the piston rod with the fluid actuating piston thereon.

Referring to the drawings in detail, it will be seen that the reference numeral 1 designates a housing through which extends the axle 2 having keyed thereon the wheel 3 to the inner side of the hub portion of which is secured in any suitable manner, the brake drum 4. The drum 4 is disposed in the casing 5 on the end of the housing 1, and brake shoes 6 are pivotally mounted, at their lower ends, on the inside of the casing 5 for engagement with the inner periphery of the drum 4.

A horizontally disposed cylinder 7 is rigidly mounted in the casing 5 between the upper end portions of the shoes 6, said cylinder 7 being open at its ends and having mounted therein for reciprocating movement in opposite directions the pistons 8 which are operatively coupled to the free end portions of the shoes 6 by the connecting rods 9.

A vertically disposed cylinder 10 is mounted rigidly in the lower portion of the casing 5 and has mounted for reciprocation therein the piston 11 which projects below the cylinder 10 and has its lower end portion bifurcated. A friction roller 12 is journaled between the arms provided on the lower end partition 11 for engagement with the inner periphery of the drum 4 for actuation by said drum when the wheel 3 is rotating and the roller 12 is engaged therewith. A coil spring 13 is disposed in the cylinder 10 and engages with the piston 11 in a manner to yieldingly urge the said piston upwardly and maintain the friction roller 12 out of engagement with the drum 4.

A fluid pressure cylinder 14 has its forward end communicating with the upper end of the cylinder 10 through the pipe 15. A fluid conducting pipe 16 also leads from the forward end of the cylinder 14 to a three-way valve 17, mounted in a housing 18. A pipe 19 extends from the three-way valve 17 to the cylinder 7, and communicates with said cylinder 7 between the pistons 8 therein. A pipe 20 leads from the three-way valve 17 to a valve 21, the purpose of which will be hereinafter more fully set forth.

The three-way valve 17 includes a core 22 having a diametrically extending passage 23 for registry with the pipes 19 and 20, and said core is further provided with a passage 24 for establishing communication between the pipes 16 and 19. An operating crank 25 is attached to the core 22 and is disposed in the housing 18.

A shaft 26 is rotatably mounted in the housing 18 and has operatively mounted thereon a centrifugal governor 27. A gear 28 is fixed on the shaft 26 and is in mesh with a comparatively large gear 29, which is fixed on a flexible drive shaft 30 which has one end connected to the friction roller 12 for actuation by said friction roller. A lever 31 is pivotally mounted on a suitable supporting bracket 32 in the housing 18 and has an intermediate portion operatively connected to the governor 27 as at 33.

The upper end of the lever 31 is loosely connected to the crank 25 of the core 22 by the link 34.

A rod 35 extends slidably into the fluid pressure cylinder 14 through the rear end thereof and has fixed thereon within the cylinder 14, a piston 36 for reciprocating movement in the cylinder as will be apparent. A check valve controlled passage 37 is provided in the forward end portion of the piston rod 35 for permitting the passage of fluid from the rear portion of the cylinder 14 to the forward portion thereof upon rearward movement of the piston 36 in the cylinder 14. The piston rod 35 is operatively connected by a link 38 to the foot pedal 39, said foot pedal having a rockable head 40 on its upper end. An arm 41 is rigidly connected to the head 40 for rocking movement therewith, and said arm 41 is connected by a link 42 with the arm 43 of the valve 21.

In operation, when it is desired to apply the brake, the pedal 39 is swung forwardly to move the piston 36 forwardly in the cylinder 14. Fluid under pressure passes from the cylinder 14 through the pipe 15 to the cylinder 10 in the housing 5, and the piston 11 is forced downwardly in a manner to engage the friction roller 12 with the drum 4. The friction roller 12 will drive the governor 27 through the medium of the flexible drive shaft 30, the gears 28 and 29 and the shaft 26. The governor 27 moves the valve core 22 to a position to establish communication between the pipes 16 and 19 through the passage 24 in the core and fluid under pressure will then pass from the cylinder 14 to the cylinder 7 in the housing 5 in a manner to move the pistons 8 in opposite directions and apply the brake shoes 6.

Should the wheel be locked, the friction roller 12 will, of course, cease rotating and the governor 27 will be rendered inoperative and return to its normal position. This movement of the governor 27, in returning to its normal position actuates the core 22 in a manner to interrupt the communication between the pipes 16 and 19 and to establish communication between the pipes 19 and 20 and the fluid is thus permitted to leave the cylinder 7 and is exhausted to atmosphere through the valve 21 which is normally open, said fluid, of course, passing through the passage 23 in the core 22. The wheel is thus released, and when same again starts to turn, the governor 27 is again actuated by the friction roller 12 to position the valve core 22 to again establish communication between the pipes 16 and 19, and fluid may again be forced under pressure into the cylinder 7 for engaging the brake shoes 6.

When it is desired to maintain the shoes 6 in applied position, as when the vehicle is parked, the head 40 on the pedal 39 is rocked in a manner to close the valve 21, and thus prevent the exhaustion of the fluid from the cylinder 7 when the governor 27 moves the valve core 22 to establish communication between the pipes 19 and 20 upon the stopping of the vehicle. When the piston 36 is returning to its inoperative position in the rear end portion of the cylinder 14, fluid passes through the check valve controlled passage 37 to the forward side of the piston 36.

It is believed that the many advantages of a fluid brake constructed in accordance with this invention will be readily understood and although the preferred embodiment of the invention is as illustrated and described, it is to be understood that changes in the details of construction may be had which will fall within the scope of the invention as claimed.

What is claimed is:

1. A fluid brake comprising a casing, a drum rotatably disposed in the casing, brake shoes pivotally mounted at one end on the casing and engageable with the inner periphery of the drum, a horizontally disposed cylinder mounted in the casing between the free end portions of the brake shoes, pistons mounted for reciprocation in opposite directions in the cylinder, and operatively connected with the free end portions of the brake shoes, a fluid pressure cylinder, a fluid actuating piston therein, a multi-way valve, a fluid conducting pipe extending from one end portion of the fluid pressure cylinder to the valve, a fluid conducting pipe extending from the valve to the first named cylinder, an exhaust pipe leading from the valve, said valve adapted to establish communication between the first two named pipes or between the second and third named pipes, a speed responsive device, means operatively connecting the speed responsive device with the drum for actuation by said drum, means operatively connecting the speed responsive device to the valve in a manner to actuate said valve to establish communication between the first and second named pipes when the speed responsive device is in operation and for establishing communication between the second and third named pipes when the speed responsive device is stationary, the means for operatively connecting the speed responsive device to the brake drum comprising a cylinder mounted in the casing, a piston mounted for reciprocation in the last named cylinder, a friction roller journaled on the piston and engageable with the brake drum for actuation by said brake drum, and a shaft operatively connecting the friction roller with the speed responsive device.

2. A fluid brake comprising a casing, a drum rotatably disposed in the casing, brake shoes pivotally mounted at one end on the casing and engageable with the inner periphery of the drum, a horizontally disposed cylinder mounted in the casing between the free end portions of the brake shoes, pistons mounted for reciprocation in opposite directions in the cylinder and operatively connected with the free end portions of the brake shoes, a fluid pressure cylinder, a fluid actuating piston therein, a multi-way valve, a fluid conducting pipe extending from one end portion of the fluid pressure cylinder to the valve, a fluid conducting pipe extending from the valve to the first named cylinder, an exhaust pipe leading from the valve, said valve adapted to establish communication between the first two named pipes or between the second and third named pipes, a speed responsive device, means operatively connecting the speed responsive device with the drum for actuation by said drum, means operatively connecting the speed responsive device to the valve in a manner to actuate said valve to establish communication between the first and second named pipes when the speed responsive device is in operation and for establishing communication between the second and third named pipes when the speed responsive device is stationary, the means for operatively connecting the speed responsive device to the brake drum comprising a cylinder mounted in the casing, a piston mounted for reciprocation in the last named cylinder, a friction roller journaled on the piston and engageable with the brake drum for actuation by said brake drum, a shaft operatively connecting the friction roller with the speed responsive device, a pipe extending from the forward end of the fluid pressure cylinder to the upper end portion of the last named cylinder for the passage of fluid under pressure into said last named cylinder upon movement of the piston in the fluid pressure cylinder in a forward direction, and manually operable piston for actuating the means in the fluid pressure cylinder.

3. A fluid brake comprising a casing, a drum rotatably disposed in the casing, brake shoes pivotally mounted at one end on the casing and engageable with the inner periphery of the drum, a horizontally disposed cylinder mounted in the casing between the free end portions of the brake shoes, pistons mounted for reciprocation in opposite directions in the cylinder and operatively connected with the free end portions of the brake shoes, a fluid pressure cylinder, a fluid actuating piston therein, a multi-way valve, a fluid conducting pipe extending from one end portion of the fluid pressure cylinder to the valve, a fluid conducting pipe extending from the valve to the first named cylinder, an exhaust pipe leading from the valve, said valve adapted to establish communication between the first two named pipes or between the second and third named pipes, a speed responsive device, means operatively connecting the speed responsive device with the drum for actuation by said drum, means operatively connecting the speed responsive device to the valve in a manner to actuate said valve to establish communication between the first and second named pipes when the speed responsive device is in operation and for establishing communication between the second and third named pipes when the speed responsive device is stationary, the means for operatively connecting the speed responsive device to the brake drum comprising a cylinder mounted in the casing, a piston mounted for reciprocation in the last named cylinder, a friction roller journaled on the piston and engageable with the brake drum for actuation by said brake drum, a shaft operatively connecting the friction roller with the speed responsive device, a pipe extending from the forward end of the fluid pressure cylinder to the upper end portion of the last named cylinder for the passage of fluid under pressure into said last named cylinder upon movement of the piston in the fluid pressure cylinder in a forward direction, manually operable means for actuating the piston in the fluid pressure cylinder, the last named means comprising a swingable pedal, a piston rod fixed to the piston, means operatively connecting the piston rod to the pedal, a control valve mounted in the exhaust pipe, a rockable head on the foot pedal, and a link operatively connecting the rockable head to the last named valve for opening and closing the exhaust pipe.

In testimony whereof I affix my signature.

NATHAN H. HIATT.